United States Patent
Stretch et al.

(10) Patent No.: US 6,412,618 B1
(45) Date of Patent: Jul. 2, 2002

(54) BALL-RAMP-ACTUATED FRICTION CLUTCH CONTROLLED BY A PARTICLE-CLUTCH

(75) Inventors: Dale A. Stretch, Livonia; James K. Spring, Brighton, both of MI (US)

(73) Assignee: Eaton Corporation, Cleveland, OH (US)

(*) Notice: Subject to any disclaimer, the term of this patent is extended or adjusted under 35 U.S.C. 154(b) by 3 days.

(21) Appl. No.: 09/604,156

(22) Filed: Jun. 27, 2000

(51) Int. Cl.[7] .................. F16D 27/115; B60K 17/35
(52) U.S. Cl. .................. 192/35; 192/21.5; 192/57
(58) Field of Search .................. 192/21.5, 35, 48.2, 192/57; 180/247, 249, 250

(56) References Cited

U.S. PATENT DOCUMENTS

| | | | |
|---|---|---|---|
| 1,974,390 A | 9/1934 | Eason | 192/35 |
| 2,605,877 A | 8/1952 | Winther | 192/84 |
| 2,709,507 A * | 5/1955 | Trickey | 192/21.5 |
| 2,738,045 A | 3/1956 | Mergen et al. | 192/35 |
| 2,861,225 A | 11/1958 | Mergen | 317/189 |
| 2,937,729 A | 5/1960 | Sperr, Jr. | 192/84 |
| 4,562,897 A | 1/1986 | Renneker | 180/233 |
| 4,805,486 A | 2/1989 | Hagiwara et al. | 74/710.5 |
| 4,849,120 A * | 7/1989 | Price et al. | 192/21.5 X |
| 4,989,686 A | 2/1991 | Miller et al. | 180/197 |
| 5,070,975 A | 12/1991 | Tanaka et al. | 192/35 |
| 5,092,825 A | 3/1992 | Goscenski, Jr. et al. | 475/150 |
| 5,322,484 A * | 6/1994 | Reuter | 192/21.5 X |
| 5,372,106 A | 12/1994 | Botterill | 123/198 |
| 5,441,137 A | 8/1995 | Organek et al. | 192/35 |
| 5,464,084 A | 11/1995 | Aoki et al. | 192/35 |
| 5,485,904 A | 1/1996 | Organek et al. | 192/35 |
| 5,505,285 A | 4/1996 | Organek | 192/35 |
| 5,520,590 A | 5/1996 | Showalter et al. | 475/295 |
| 5,528,950 A | 6/1996 | Organek et al. | 74/339 |
| 5,584,776 A | 12/1996 | Weilant et al. | 475/213 |
| 5,609,219 A | 3/1997 | Watson et al. | 180/248 |
| 5,620,072 A | 4/1997 | Engle | 192/35 |
| 5,713,445 A | 2/1998 | Davis et al. | 192/35 |
| 5,713,446 A | 2/1998 | Organek et al. | 192/35 |
| 5,819,883 A | 10/1998 | Organek et al. | 188/71.5 |
| 5,915,513 A * | 6/1999 | Isley, Jr. et al. | 192/35 |
| 5,943,911 A | 8/1999 | Beckerman | 74/333 |
| 5,953,959 A | 9/1999 | Organek et al. | 74/339 |
| 5,954,173 A | 9/1999 | Sakai et al. | 192/35 |
| 5,967,276 A | 10/1999 | Leichliter et al. | 192/35 |
| 6,092,633 A * | 7/2000 | Morisawa | 192/35 |

FOREIGN PATENT DOCUMENTS

| | | | |
|---|---|---|---|
| GB | 2315531 A | 4/1998 | |
| JP | 59-43232 A * | 3/1984 | 192/21.5 |

* cited by examiner

Primary Examiner—Richard M. Lorence
(74) Attorney, Agent, or Firm—Rader, Fishman & Grauer PLLC

(57) ABSTRACT

A particle clutch and a ball-ramp-actuated friction clutch controlled by the particle clutch. The particle clutch includes input and output couplings, the transfer of force therebetween being determined by the shear viscosity of a magnetically reactive medium, comprising magnetic particles or a magnetorheological fluid, which fills a gap between corresponding surfaces operably connected to the input and output couplings. The shear viscosity of the medium is variable by the application of a magnetic field. The output coupling is operably connected to one side of the ball-ramp actuator, such that a transfer of force between the input and output couplings causes a relative rotation in the actuator, initiating a camming action that compresses friction plates within the friction clutch for transfer of torque through the friction clutch.

17 Claims, 5 Drawing Sheets

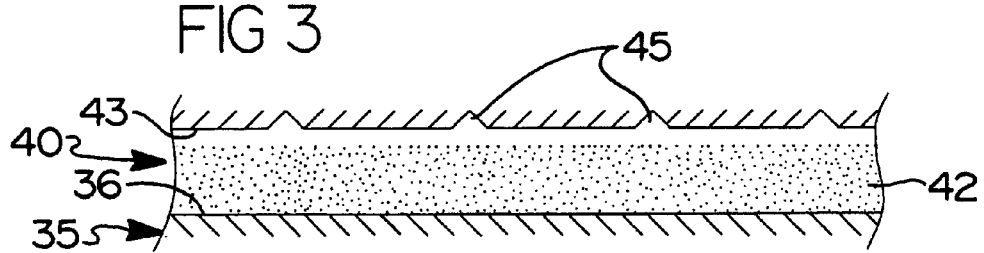
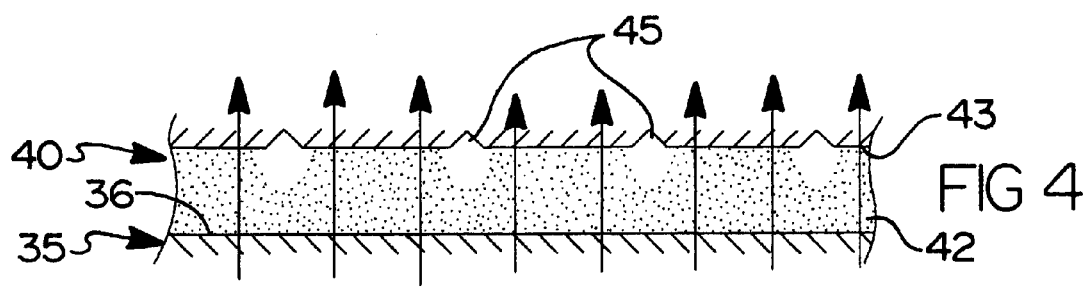
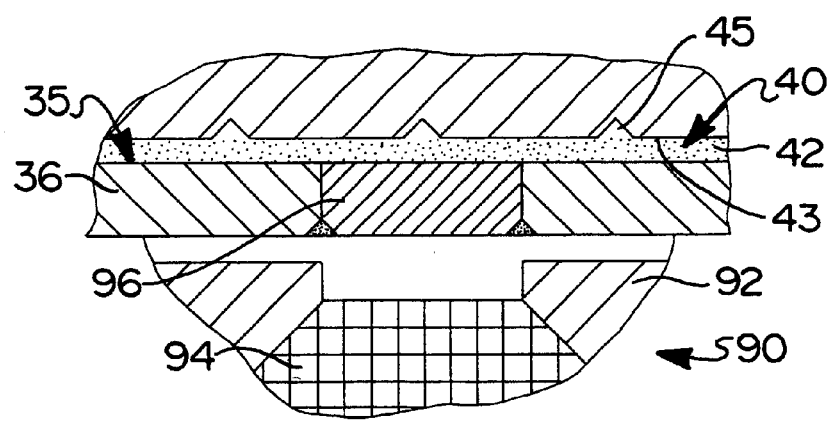

BALL-RAMP-ACTUATED FRICTION CLUTCH CONTROLLED BY A PARTICLE-CLUTCH

BACKGROUND OF THE INVENTION

1. Field of the Invention

The invention relates to differential devices, and more particularly to driveline systems for vehicles providing variable torque transfer. More specifically, the invention relates to torque transfer using a ball-ramp-actuated friction clutch. In another of its aspects, the invention relates to control of the ball-ramp actuator by a particle clutch.

2. Description of the Related Art

In many of the vehicles being produced today, the basic vehicle platform uses front wheel drive. However, in many such vehicles, especially in vans and sport utility vehicles, it is desirable to provide four-wheel-drive, at least under certain operating conditions.

Typically, the various arrangements for achieving part-time four-wheel-drive have been complex and expensive, sometimes requiring some sort of control scheme to achieve the four wheel drive (or rear wheel drive) in response to certain predetermined operating conditions.

In certain vehicle applications, it is acceptable to provide only front wheel drive under most operating conditions. Thus, rear wheel drive is required only when the front drive wheels are slipping (e.g., under poor traction conditions). However, the prior art has not provided a suitable device wherein only front wheel drive is provided, with no substantial torque being transmitted to the rear wheels, until the front wheels begin to slip. For example, U.S. Pat. No. 4,562,897 discloses a viscous clutch in the driveline system between the front transaxle and the rear wheels. However, the system requires a selector arrangement to choose among transmitting torque through the viscous coupling, disconnecting the viscous coupling, or bypassing it.

Implementation of such a selector arrangement adds substantially to the overall complexity and cost of the driveline system, and as is well known to those skilled in the art, component cost is a major factor in determining whether or not a particular system or component will be utilized on a vehicle.

It is known from U.S. Pat. No. 5,070,975 and from European Application EP 0 314 420 to use, as a center differential in a four-wheel driveline, a viscous-actuated ball-ramp-type friction clutch to transmit torque to the rear axles when there is a speed difference between the front and rear wheels. It is believed that the torque transmitting capability of the device of the cited patent and application would be somewhat limited by the fact that one of the ball-ramp plates comprises the input to the viscous coupling. Despite the limited torque capability the device of the cited patent would most likely be substantially more expensive than would be acceptable for typical vehicle applications. One of the reasons for the excessive cost of the device of the cited patent is the use of a fairly conventional type of cast housing, having several different machined internal diameters, internal snap ring and O-ring grooves, and a set of internal splines.

An improvement to the aforementioned differentials is disclosed in U.S. Pat. No. 5,967,276, commonly owned with the instant application, wherein a ball-ramp-actuated clutch is contained in a stamped housing, reducing the cost of manufacture, and the ball-ramp actuator is itself actuated by a sealed viscous coupling, reducing the complexity of control and the need for additional control systems. The differential disclosed therein, therefore, presents a sealed unit displaying response characteristics that are fixed so long as the unit remains sealed and in good working order. An operator cannot adjust the torque transfer characteristics within the differential.

It would be advantageous, therefore, to provide a differential device that is effective and durable, and simple and cost-effective to manufacture, as the device disclosed in U.S. Pat. No. 5,967,276, yet with the flexibility of being responsive to operator control. It would further be advantageous to provide a differential device capable of displaying variable torque transfer characteristics, as may be required for differing conditions within a single application, or as may be required to use a single differential design in multiple applications without the need for substantial modification.

SUMMARY OF THE INVENTION

The invention is directed to a particle clutch having an input coupling and an output coupling. The input and output couplings each include surfaces that are oriented parallel one to the other. These surfaces are separated by a narrow gap that is filled with a magnetically-reactive medium whose properties change when exposed to a magnetic field. The medium can be in the form of fine magnetically-reactive particles, or can be a magnetorheological fluid. The ability of the medium to transfer force between the surfaces of the input and output couplings is controllable and predictable as a function of the strength of the magnetic field. The magnetic field can come from an electromagnet, a permanent magnet, or any combination of known magnets.

The invention is further directed to a differential device using a particle clutch for controlling a friction clutch. A preferred embodiment of the invention includes a friction clutch that is actuated by a ball-ramp assembly. The ball-ramp assembly includes two plates with camming elements such as balls bearing against the facing surfaces of the plates. The output coupling of the particle clutch is connected to one of the plates. When the output coupling is acted upon by the input coupling through the viscous shear of the fluid, it acts to cause the ball-ramp actuator to separate the plates and thereby engage the friction clutch.

The differential device further includes a housing having at least one internal groove running its length, and at least a first friction disc with a projection corresponding to the groove. The input coupling member of the particle clutch also includes a projection corresponding to the groove. The housing also includes an inturned shoulder at one end to retain the particle clutch axially against the ball-ramp-actuator and an outwardly extending shoulder adjacent the friction clutch. The housing accepts an endcap, within the outwardly extending shoulder, that is engaged with additional friction discs. The endcap and additional friction discs are held axially in the housing by a second inturned shoulder, but are free to rotate within the housing. When the friction clutch is engaged, the first friction disc and the additional friction discs are forced together. This causes the additional friction discs, and the endcap, to then also be rotationally connected to the housing.

In a preferred embodiment, the housing is a unitary, stamped member having generally constant wall thickness, with a plurality of axially extending grooves. The first friction disc and the input coupling member can each include multiple projections, up to the number of grooves in the housing.

BRIEF DESCRIPTION OF THE DRAWINGS

In the drawings:

FIG. 3 is an enlarged view of a magnetic particle gap according to the invention of FIG. 2, with no magnetic field applied across the gap;

FIG. 4 is an enlarged view of the magnetic particle gap of FIG. 3 during the application of a magnetic field across the gap;

FIG. 5 is an enlarged view of the interface of the electromagnetic coil and particle clutch of FIG. 2;

DESCRIPTION OF THE PREFERRED EMBODIMENT

Figure 1:
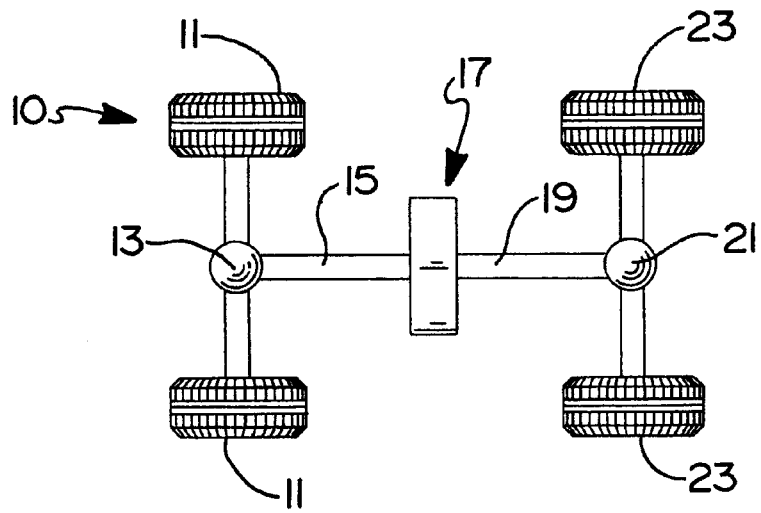
FIG. 1 is a schematic of a driveline system of the type in which the present invention might be utilized.

Referring now to the drawings, which are not intended to limit the invention, FIG. 1 is a schematic of a driveline system 10 for a four-wheel-drive vehicle, in which the present invention might be used. The driveline system 10 of FIG. 1 includes a pair of front drive wheels 11, driven by a front transaxle 13. Extending rearwardly out of the transaxle 13 is an input shaft 15, which typically receives input torque, by means of a right angle gear set (not shown in FIG. 1) in the transaxle 13, such that the speed of rotation of the input shaft 15 is representative of the speed of rotation of the front drive wheels 11.

The input shaft 15 is associated with a center differential device, generally designated 17, which includes an output shaft 19, by means of which torque may be transmitted to a rear differential 21, and then to a pair of rear drive wheels 23. Typically, the device 17 could be reversed, i.e., the shaft 19 could be the input and the shaft 15 could be the output, and therefore, the use herein of the terms "input" and "output" will be understood as explanatory and not limiting. As mentioned previously, it will be understood by those skilled in the art that the term "center differential device" does not mean or imply that the device include a conventional differential gear set, but instead, the term will be understood in its broader sense to mean that the device 17 will permit differentiating, action between the input shaft 15 and the output shaft 19. In the subject embodiment, the front drive wheels 11 are the primary drive wheels, and the rear drive wheels 23 are only secondary drive wheels. However, within the scope of the present invention, such could be reversed, i.e., the rear wheels being the primary drive wheels and the front wheels being the secondary drive wheels.

Although the present invention will be described as though the front wheels 11 and the rear wheels 23 normally rotate at the same speed, as the vehicle is travelling straight ahead, those skilled in the art will understand that this is typically not the case. For various reasons, such as the fact that the front wheels normally have a smaller rolling radius, the front drive wheels 11 typically rotate somewhat faster than the rear wheels 23. Therefore, in a drive system of the type shown in FIG. 1, there is almost always at least some torque being transmitted by the center differential device 17.

Figure 2:
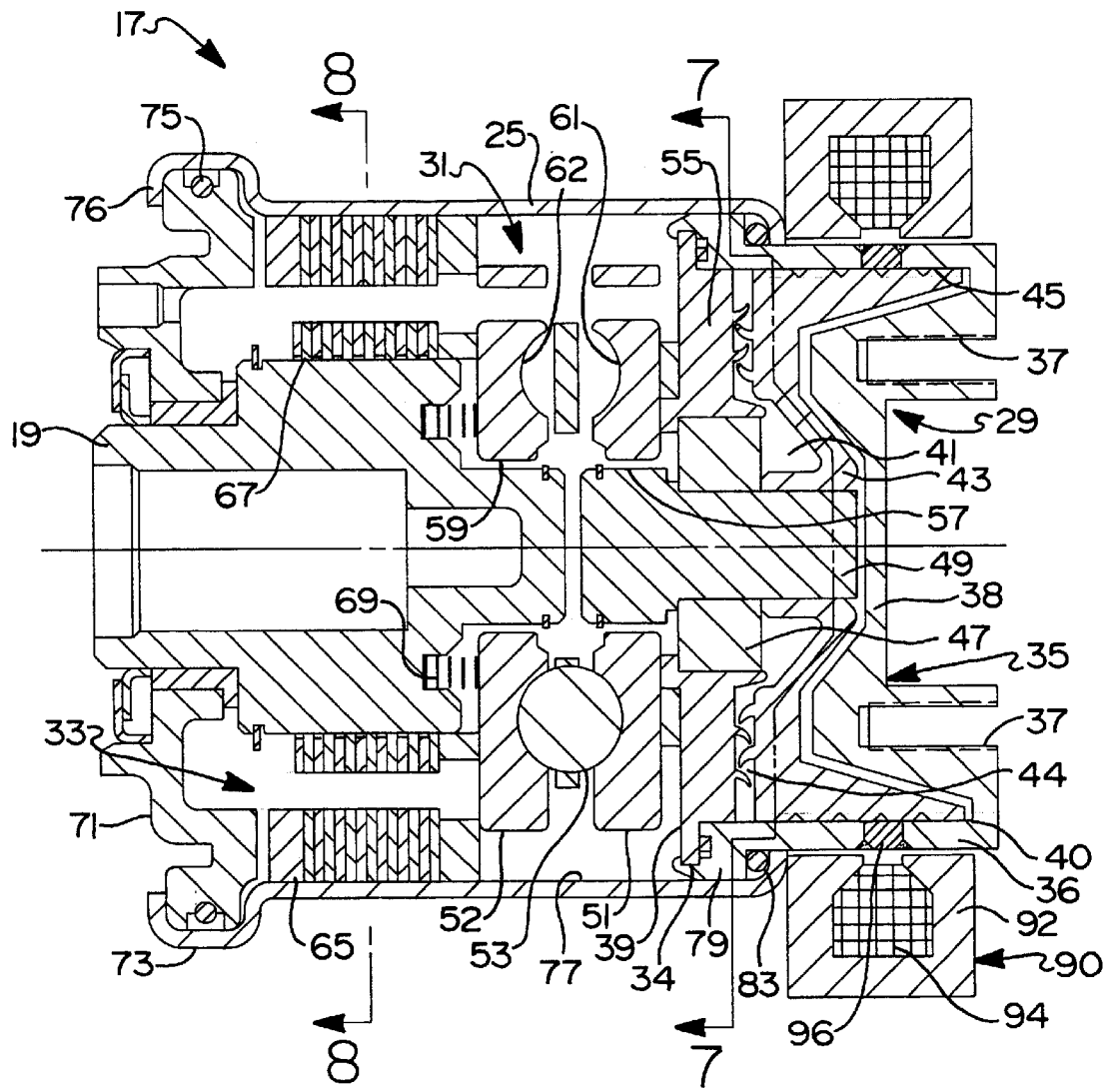
FIG. 2 is a cross-sectional view of a particle-clutch-controlled ball-ramp-actuated friction clutch according to the invention.

Referring now primarily to FIG. 2, the center differential device 17 will be described in some detail. The device 17 includes a housing 25. Disposed within the housing 25, the center differential device 17 may be viewed as comprising three separate portions as follows: a particle clutch 29; a ball ramp actuator 31; and a friction-type clutch pack 33. It is one important feature of the present invention that these portions comprise separate, somewhat functionally independent devices, as will become apparent from the subsequent description.

The particle clutch 29 includes an input coupling member 35 having a generally cylindrical, cup-like configuration defining an interior bounded by a peripheral wall 36 and a closed end 38 and further having an open end 34, and which is fixed to the housing 25, in a manner to be described subsequently. The input coupling member 35 further defines on its exterior at the closed end an input shaft recess and a plurality of threaded bores 37 for bolting the input shaft 15 to the input coupling member 35 of the differential device 17. The particle clutch 29 also includes a cap 39, such that input coupling member 35 and cap 39 cooperate to enclose a totally functional, self-contained particle clutch, defining a particle clutch chamber 41. Preferably, the input coupling member 35 and cap 39 are assembled by means of a rollover of a portion of the input coupling member 35 about the outer periphery of the cap 39, in a manner well known to those skilled in the art.

Disposed within the chamber 41 is an output coupling drum 43 having a generally cylindrical outer surface parallel to peripheral wall 36, and including a plurality of grooves 45, depicted in the figure as generally triangular in cross-section, but not intended to be limited thereto. Grooves 45 can also, in the alternative, be located on the inner surface of peripheral wall 36.

Referring to FIGS. 3 and 4, input coupling member 35 and output coupling drum 43 are not in direct contact, but define therebetween a uniform gap 40, generally toroidal in configuration and in the illustrated embodiment taking the form of the wall of a hollow right cylinder. Gap 40 is of a width to permit a thin layer of a magnetically-reactive medium, such as a magnetically-reactive powder or a magnetorheological fluid 42 (hereinafter referred to as MR fluid for the sake of brevity) to reside therein between the inner wall of the input coupling member 35 and the outer wall of the output coupling drum 43. Grooves 45 serve the purpose of providing additional physical volume for the distribution of MR fluid 42 in gap 40 when the magnetic field is not applied, and, as shown in FIG. 4, aid in concentrating the lines of magnetic flux across gap 40.

FIG. 3 shows MR fluid 42 disposed between input coupling member 35 and the output coupling drum 43, without the application of a magnetic field to MR fluid 42. MR fluid 42 is pressed outwardly against input coupling member 35 due to the centrifugal forces of rotation of device 17, in a non-aligned configuration, transferring no appreciable torque across gap 40. Input coupling member 35 and output coupling drum 43 are thus free to rotate relative to one another. Such relative rotation between the member 35 and the drum 43 will result from a difference in rotational speed of the member 35 and the drum 43, associated with differences in the rotational speeds of input and output shafts 15, 19 respectively. The difference in speed is typically referred to as the "slip speed".

FIG. 4 shows gap 40 during application of a magnetic field. Upon application of a magnetic field, MR fluid 42 changes, in relation to the intensity of the magnetic field, by aligning with the magnetic flux lines as shown in FIG. 4. A magnetically-reactive powder, under the influence of the magnetic field, will stiffen, creating a mechanical friction against the surfaces facing gap 40 and a corresponding transfer of torque between the surfaces. A magnetorheological fluid, which is more typically composed of magnetically-reactive components in an oil base, will increase in viscosity, and therefore the viscous shear in the fluid will increase, also resulting in a transfer of torque between the surfaces facing gap 40. The magnetorheological fluid comprising an oil base has the advantage of providing lubrication in the device during periods when the clutch is not engaged, and further can be pumped as a fluid. However, in a device exhibiting extended slipping and the resulting generation of heat, the magnetically-reactive powder has the advantage of being resistant to temperature levels that would degrade the oil-based magnetorheological fluid, thereby preventing it from functioning in its intended fashion.

As illustrated in FIG. 2, a non-contact seal 44 is formed between drum 43 and cap 39. This type of "labyrinth" seal is effective to retain a magnetically-reactive powder within chamber 41, but is generally ineffective in retaining a viscous fluid. A sealed bearing set 47, disposed at the radially inner periphery of the cap 39, will prevent a magnetorheological fluid from escaping chamber 41, and any oils in the remainder of device 17 from infiltrating chamber 41. Because the particle clutch chamber 41 is permanently sealed to retain the MR fluid and keep out contaminants, particle clutch 29 will respond to the application of a magnetic field in a repeatable manner throughout its service life. The torque transferred by particle clutch 29 is therefore varied only by the strength of the applied magnetic field.

Disposed at the radially inner periphery of the cap 39, bearing set 47 has its inner race disposed on a shaft portion 49, which is shown in FIG. 2 as having the output coupling drum 43 pressed onto the shaft portion 49. The shaft portion 49 extends axially out of the particle clutch 29 and into the ball ramp actuator 31. The rest of the function of the shaft portion 49 will be described subsequently.

Figure 2A:
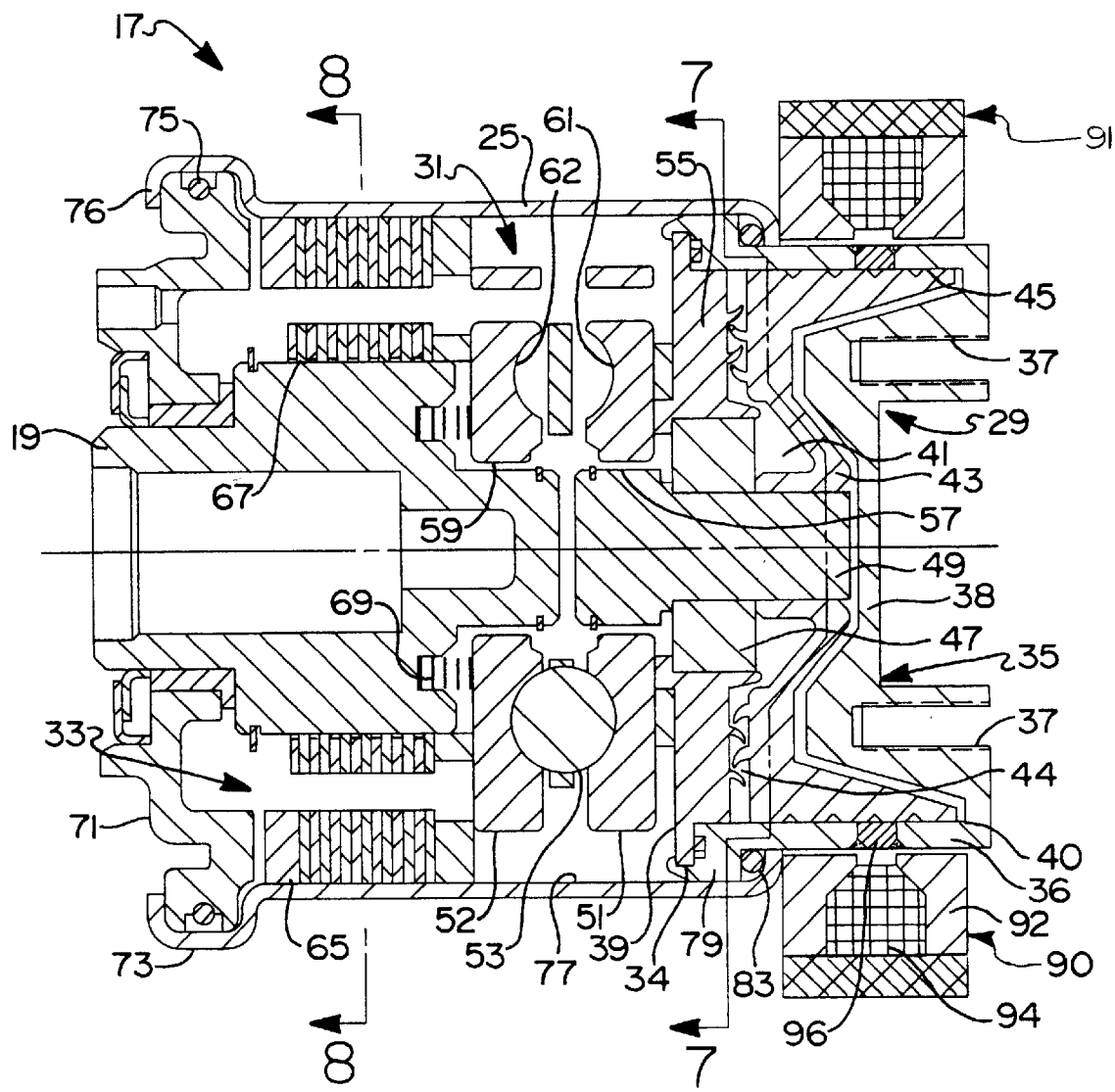
FIG. 2A is a cross-sectional view of a particle-clutch-controlled ball-ramp-actuated friction clutch showing a source of magnetic flux that includes a permanent magnet and an electromagnet.

The particle clutch 29 further requires a source of magnetic flux. As shown in FIG. 2, and with reference now to FIG. 5, a stationary toroidal electromagnetic 90 is mounted on the outside of the input coupling member 35. In the alternative, as illustrated in FIG. 2A, the magnetic source can be a permanent magnet 91 supplemented by a counteracting electromagnet so that particle clutch 29 will default to being engaged should electromagnet 90 fail. Electromagnet 90 comprises a rigid shell 92, shown as being C-shaped in cross-section and opening to the inside of the toroid, and having known magnetic properties, and a typical coil conductive wire 94, application of an electric current to the coil generating a known electromagnetic field in the vicinity of electromagnet 90. Input coupling member 35 further incorporates in its peripheral wall a continuous ring of non-magnetic material 96 collocated with the open inner face of shell 92 of electromagnet 90 to prevent magnet flux generated by electromagnet 90 from short-circuiting through input coupling member 35 rather than spanning the gap between input coupling member 35 and output coupling drum 43. As stated above, particle clutch 29 is a sealed unit having known properties, particularly the properties of the MR Fluid, the size of the gap between member 35 and drum 43, and the nature of input coupling member 35 as an element in a magnetic circuit. The only variables influencing the transfer of torque within particle clutch 29 are therefore the slip speed and the strength of any applied magnetic field. Electromagnet 90 is controlled by an electronic controller based on algorithms chosen to control the differential in manners consistent with the intended and desired uses of the vehicle. By way of example, the controller provides the vehicle operator with the option of choosing the degree of power transmission to be transferred to the rear wheels under normal operations, including full-time four-wheel-drive. Alternatively, the operator may choose to let the controller automatically transfer power to the rear wheels on an as-needed basis, such as when the front wheels slip, the relative slipping speed of the input and output axles provided to the controller by sensors well known in the art. The controller processes all input, being sensor readings or operator selections, to determine the appropriate current level needed by electromagnet 90 to generate the magnetic flux that will change the properties of MR fluid 42 in particle clutch 29 to achieve the resultant torque transfer within device 17.

Referring again to FIG. 2, the ball ramp actuator 31 includes a first ramp plate 51, a second ramp plate 52, and a plurality of balls 53, although it should be understood that any form of cam member may be used. Disposed axially between the first ramp plate 51 and the housing 39 is a thrust bearing set 55. Although a device such as a bronze bushing could be used if handling the axial loading were the only concern, it is significant that the bearing 55 comprise a true "rolling" bearing, such as a needle type bearing. The reasons for this, and the benefits thereof will be described in greater detail subsequently.

Shaft portion 49 is preferably in splined engagement with the first ramp plate 51, by means of a set of splines 57. Therefore, the output coupling drum 43 of the particle clutch 29 rotates at the same speed as the first ramp plate 51, by means of the shaft portion 49. The second ramp plate 52 is in splined engagement with the output shaft 19, by means of a set of splines 59, such that the second ramp plate 52 and the output shaft 19 rotate at the same speed. Alternatively, the shaft 49 and possibly also the forward end of the output shaft 19 could define a shape such as a hexagon, with the adjacent internal surfaces of the coupling drum 43, and the ramp plates 51 and 52 defining mating shapes.

In a manner well known to those skilled in the art, the first ramp plate 51 defines a plurality of first ramp surfaces 61, while the second ramp plate 52 defines a plurality of second ramp surfaces 62. In FIG. 2, the ball ramp actuator 31 is shown in its "neutral" position, i.e., each of the balls 53 is disposed in the "valley" of each of the ramp surfaces 61 and 62, such that the ramp plates 51 and 52 are at their minimum axial distance from each other, or stated another way, the overall axial dimension of the plates 51 and 52 is at a minimum. As is also well known to those skilled in the art, the neutral position of the ball ramp actuator 31 would correspond, typically, to a disengaged condition of the clutch pack 33. Preferably, the first and second ramp surfaces 61 and 62 include first and second detents (not illustrated herein), such that a very definite, predetermined speed difference (slip speed) within the particle clutch 29 is required to initiate ramping of the actuator 31, and such ramping will not occur in response merely to the very slight differences which may occur in response to variations in factors such as tire size, etc.

Disposed immediately adjacent the second ramp plate 52 is the clutch pack 33, including a plurality of outer friction discs 65, and a plurality of inner friction discs 67. The outer discs 65 are in engagement with the housing 25, as described hereinafter. The inner friction discs 67 are in splined engagement with a set of splines (not shown herein) defined on the outer cylindrical surface of the output shaft 19. Although flat friction discs are illustrated and described herein, it should be understood that the invention is not so limited, and various other friction devices could be used, such as cone-shaped members. Therefore, as used hereinafter, the term "disc" will be understood to mean and include all such suitable friction devices.

Although not an essential feature of the present invention, each of the friction discs 65 and 67 is provided with a suitable friction material, preferably a pyrolytic carbon friction material, made in accordance with the teachings of U.S. Pat. No. 4,700,823, assigned to the assignee of the present invention and incorporated herein by reference, or perhaps, another material suitable for the particular application and environment. It should be understood by those skilled in the art that, when the ball ramp actuator 31 is in its neutral position, and the clutch pack 33 is "disengaged", the friction discs 65 and 67 may be literally disengaged, in the sense of not even touching each other, but more likely, will be touching each other, and able to transmit some torque, but substantially less than the maximum torque which can be transmitted through the clutch pack 33.

Disposed in openings or recesses in the front of output shaft 19 (its right end as seen in FIG. 2) is a plurality of spring assemblies 69, which, in the subject embodiment, comprise a pack of wave or leaf type springs. The forward ends of the spring assemblies 69 engage the second ramp plate 52, and the function of the spring assemblies 69 is to bias the second ramp plate 52 forwardly, tending to return the ball ramp actuator 31 toward its neutral position.

Figure 6:
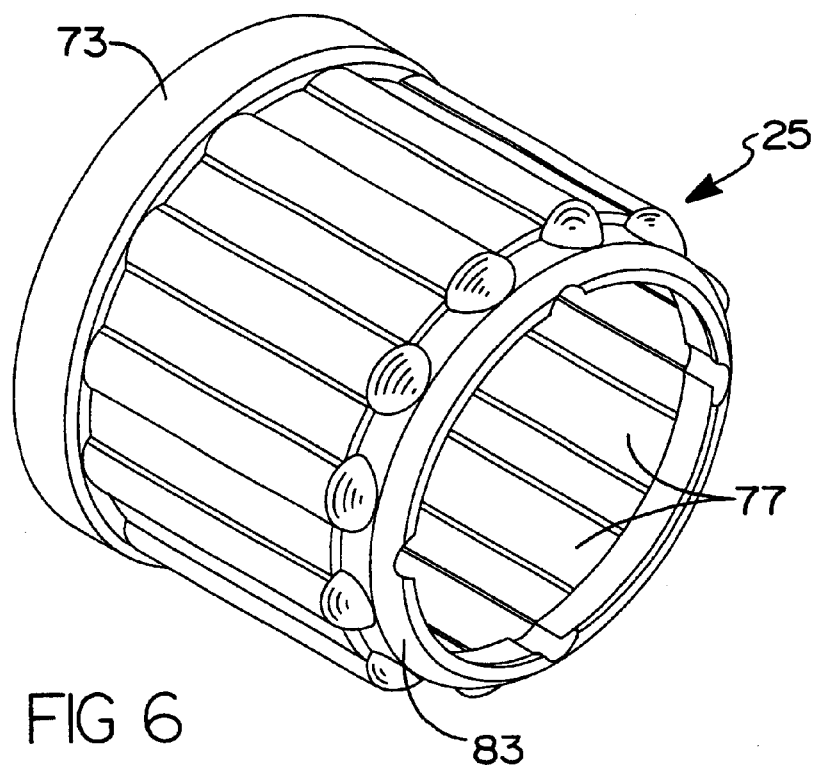
FIG. 6 is a perspective view of the housing of the differential device, the housing comprising an important aspect of the present invention.
Figure 7:
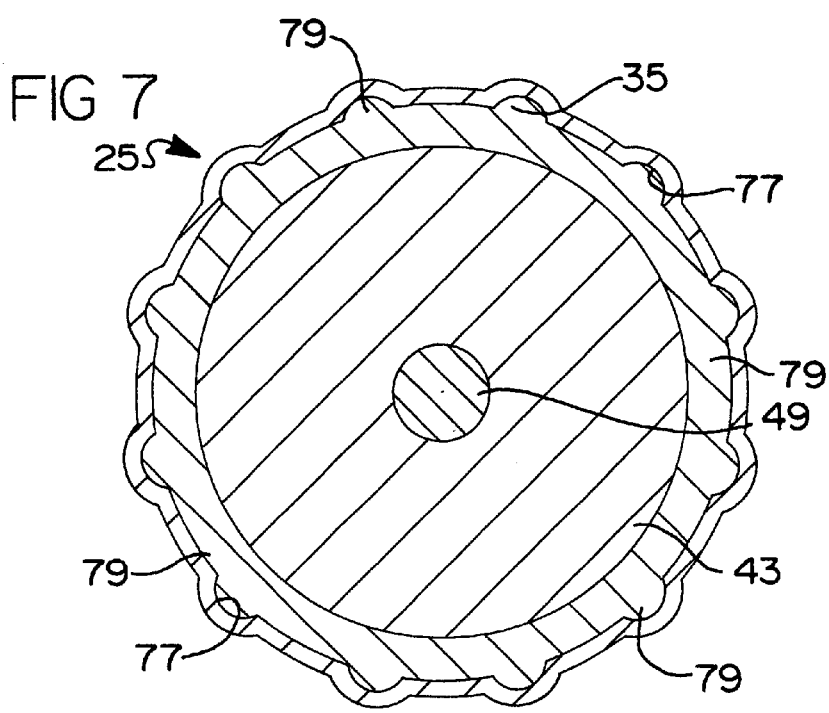
FIG. 7 is a cross-sectional view taken through line 7—7 of FIG. 2.
Figure 8:
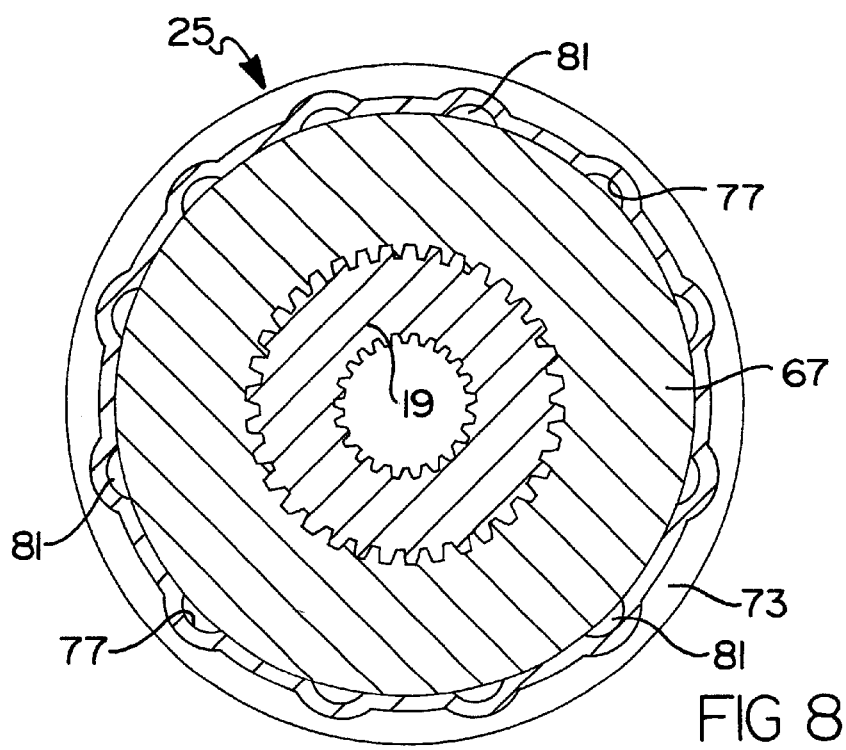
FIG. 8 is a cross-sectional view taken through line 8—8 of FIG. 2.

Referring now to FIGS. 6, 7, and 8, in conjunction with FIG. 2, an endcap member 71 is disposed axially adjacent the friction discs 65, 67 and as shown in FIG. 2, has an outer diameter which is larger than that of the housing 25, over most of its axial length. However, the housing 25 is formed to have an enlarged portion 73, and defines an inside shoulder surface 75, against which the adjacent surface of the endcap member 71 is seated, such that the shoulder surface 75 serves as a stop surface. In the alternative, housing 25 can include a plurality of bosses (e.g. three) to serve together as a stop surface. The enlarged portion 73 of the housing 25 includes a rollover 76, which will be discussed further subsequently.

As may best be seen in FIGS. 6–8, the housing 25 defines a plurality of axially-extending grooves or slots 77, and in accordance with one important aspect of the present invention, each of the grooves 77 extends axially over a major portion of the axial length of the housing 25. The input coupling member 35 defines a plurality of axially extending ridges (or raised portions) 79, which are shaped and spaced to permit the assembled particle clutch 29 to be inserted into the housing 25 with the ridges 79 to be received within the grooves 77. After assembly, the particle clutch 29 is received within the housing 25 such that there is relatively little backlash in the connection between the ridges 79 and the grooves 77.

Referring now primarily to FIGS. 2 and 8, each of the outer friction discs 65 defines a plurality of "ears" or tabs 81, each of which has approximately the same configuration as the ridges 79, in view of the fact that each of the ears 81 is received within the same grooves 77 as are each of the ridges 79, although at a different axial location therein. It will be understood by those skilled in the art that, within the scope of the invention, the grooves 77 could be "discontinuous", i.e., there could be forward grooves surrounding the particle clutch 29, and rearward grooves surrounding the clutch pack 33, with no grooves between those locations. However, in the preferred embodiment of the invention, each groove 77 extends far enough axially to receive both the input coupling member 35 and the outer friction discs 65, thus making the manufacture of the housing 25 simpler and less expensive. In the subject embodiment, and by way of example only, there are twelve of the grooves 77, twelve of the ridges 79 and twelve of the ears 81 on each outer friction disc 65.

Referring now primarily to FIGS. 2 and 6, the housing 25 includes a rollover 83 which is included to retain the particle clutch 29 within the housing 25. As used herein, the term "rollover" will be understood to mean and include the shape shown in FIG. 2 for the portion 83, whether it is made before assembly as part of the process of forming the housing, or is formed as a true rollover during the assembly process. Although the housing 25 could, within the scope of the present invention, be fabricated in any one of several ways, in the subject embodiment, the housing 25 comprises a deep drawn cup-shaped member, with the rollover 83 being at the "bottom" of the cup, and the material that will eventually comprise the rollover 76 being at the upper "lip" of the cup. As part of the deep draw process, or in a separate step, the bottom of the cup radially inward from the rollover 83 is removed, such as by means of a punch operation, as is well known in the art.

As the cup-shaped housing 25 is initially formed, the wall is cylindrical and is at the radius shown in the upper half of FIG. 2, i.e., the wall is at the radius between the grooves 77. Subsequently, an appropriate die set is used (e.g., in a progressive die set-up) to form the grooves 77, by displacing material outwardly at each of the grooves. After the grooves 77 are formed, there is a subsequent operation in which the enlarged portion 73 is formed, such as by a coining operation. As this operation is completed, the enlarged portion 73 comprises a cylindrical wall, with the material which will comprise the rollover 76 being part of the cylindrical wall. Those skilled in the metalworking arts will understand that the wall thickness of the enlarged portion 73 will be slightly less than that of the rest of the housing 25, because of the coining of the portion 73, but the resulting housing will still be considered to have a "generally constant wall thickness" as that term is used hereinafter.

The next step is to assemble the device 17, which first requires measuring the overall axial length of the assembly of the particle clutch 29, the ball-ramp actuator 31, and the clutch pack 33. This measured overall length is compared to a measured axial dimension within the housing 25, from the inside transverse surface of the rollover 83 to the inside shoulder surface 75. This measured dimension within the housing 25 should always be greater than the assembly overall length, with the difference representing the axial dimension of shims needed between the clutch pack 33 and the endcap 71 to take-up some portion of any clearance within the unit.

In actually assembling the device 17, first the particle clutch 29 is installed in the housing 25 from the "output" end, i.e., through the enlarged portion 73, with the ridges 79 sliding along the length of the grooves 77 until the particle clutch 29 is in the position shown in FIG. 2. Although certain surfaces of the member 35 may require machining, the outer surface, including the ridges 79, will remain in the as-cast condition. Subsequently, the ball-ramp actuator 31 is inserted to its position shown in FIG. 2, then the subassembly of the clutch pack 33 and the output shaft 19 is put in place as shown. Next, the required shims (not shown herein) are inserted, and then the endcap 71 is put in place against the shoulder surface 75.

With the device basically "assembled", a light biasing force, perhaps in the range of about 20 lbs., is applied axially on the endcap 71, biasing it toward the right in FIG. 2. Finally, the rollover 76 is formed, retaining the endcap 71 against the shoulder surface 75 and, because of the proper selection of the shims, retaining the particle clutch 29 against the inside surface of the rollover 83. However, it should be noted that in the subject embodiment of the invention, the shims are not selected to provide a tight fit of the various components within the housing, but instead, there is preferably a small gap between the friction discs and the endcap 71, in view of the use of detents on the ramp surfaces 61 and 62. It is believed to be within the ability of those skilled in the art, from a reading and understanding of the foregoing specification, to select the various dimensions and tolerances of the housing 25, the grooves 77, and the ridges 79 and ears 81 to accomplish the objectives of the invention. It is also believed to be within the ability of those skilled in the art to select the proper rollover force for the rollover 76, based upon a knowledge of factors such as the particular material of the housing, the wall thickness of the portion 76, and the separation forces within the device.

Although the invention is illustrated as including a housing 25 and a separate endcap member 71, those skilled in the art will understand that the housing and endcap could be formed as one integral member, in which case the order of assembly would be the clutch pack 33 first, then the ball ramp actuator 31, and finally, the particle clutch 29. The components would then be retained by forming the rollover 83 over the outer periphery of the input coupling member 35.

Operation

In operation, and under normal theoretical driving conditions, the front drive wheels 11 and the rear drive wheels 23 are all rotating at substantially the same speed, and therefore, the input shaft 15 and output shaft 19 are rotating at the same speed. In this theoretical, normal operating condition, the ball ramp actuator 31 remains in its neutral position, as shown in FIG. 2, the input coupling member 35 and output coupling drum 43 rotate at the same speed, and the clutch pack 33 is in its "disengaged" condition, as that term was explained previously. In this condition, the differential device 17 rotates substantially as a unit.

If the front drive wheels 11 lose traction, and begin to spin, or otherwise overspeed the rear wheels 23, the input shaft 15 and housing 25 will begin to rotate faster than the output shaft 19. When this occurs, the aforementioned controller processes the input signals through the control algorithms to determine what level, if any, of current must be supplied to electromagnet 90. Particle clutch 29 operates in much the same way as a typical viscous coupling, i.e., with the input rotating faster than the output, a certain amount of torque is transmitted from the input coupling member 35 to the output coupling drum 43, determined by the viscosity of the fluid in the coupling, in this case MR fluid 42, and the relative speeds of the input and output shafts 15, 19. It is an important aspect of the present invention, however, that the use of the particle clutch 29 makes the speed sensitivity of the differential device 17 variable and responsive to outside control, without breaching the seal. The application of a magnetic field increases the viscosity of MR fluid 42, thus increasing the speed sensitivity of particle clutch 29 and the amount of torque which is transmitted to the output coupling drum 43 and to first ramp plate 51.

The use of the particle clutch 29 to initiate ramping of the ball ramp actuator 31 has an additional benefit. As is well known to those skilled in the viscous clutch art, transmitting torque by viscous shear drag inherently provides a "damping" or "cushioning" effect, such that there will be no harsh or sudden engagement. Furthermore, since the viscosity of the MR fluid is variable and predictable as a function of the applied magnetic field, the same device 17 can provide a different response, controllable by the operator. It is only a matter of controlling the magnetic field strength to establish the MR fluid viscosity that produces the desired response. The device will then smoothly transfer the desired torque (or increase the transfer of torque) to the rear wheels 23. In other words, the device 17 of the invention provides a much softer engagement than does the typical prior art system.

In accordance with another important aspect of the invention, the ball ramp actuator 31 differs somewhat from many ball ramp actuators known in the prior art. Typically, those used in the prior art are responsive to any relative rotation between the ramp plates, and thus, are in effect "position sensitive". However, in the present invention, because of the biasing force of the springs 69, it takes a certain amount of torque applied to the first ramp plate 51 to achieve a certain amount of relative rotational displacement of the plates 51 and 52, and thus, a corresponding amount of axial movement of the second ramp plate 52, and a corresponding amount of loading of the clutch pack 33. In other words, the greater the amount of slip of the front drive wheels 11, the greater will be the slip speed in the particle clutch 29, and the greater will be the torque transmitted to the first ramp plate 51, and the greater will be the amount of loading of the clutch pack 33, which in turn, will result in a greater amount of torque being transmitted through the output shaft 19 to the rear drive wheels 23.

An important benefit of the particle clutch 29 comprising a self-contained unit is that cap 39 functions as an axially fixed reaction member against which the ball ramp device 31 exerts a thrust force as the ramp plates 51 and 52 begin to rotate relative to each other. Furthermore, the axially fixed cap 39 makes it possible to provide the rolling type thrust bearing 55 between the cap 39 and the ramp plate 51. The result of this arrangement is an actuator having a very low level of friction, and therefore, very little hysteresis, such that there is a desirable predictability in the actuation of the device which provides for better handling and steering of the vehicle.

Thus, the differential device 17 of the present invention provides a drive line arrangement wherein, under normal driving conditions, substantially all of the driving torque is transmitted to the front drive wheels 11, with little or no torque, as desired, transmitted to the rear drive wheels 23. However, as the front drive wheels 11 begin to slip, drive torque is automatically transferred to the rear drive wheels 23 without the need for driver intervention. The amount of transferred torque is proportional to the amount of slip of the front drive wheels 11, as further limited by the controller. It should be apparent to those skilled in the art that the device 17 could be designed, within the scope of the present invention, such that even when no substantial slip of the front drive wheels 11 is occurring, some intermediate amount of torque is being transmitted to the rear drive wheels 23. One way of doing this would be simply to apply a predetermined preload or bias to the clutch pack 33, so that there would be a predetermined amount of torque transmission from the input shaft 15 to the output shaft 19, even in the absence of any slip speed within the particle clutch 29.

The arrangement of the device 17 of the invention permits the full axial travel of the ball ramp device 31, thus permitting the use of smaller ramp angles, which in turn, provides for greater torque multiplication. As a result, even at relatively low slip speeds, it is possible to generate a relatively high torque, if desired, which provides a "limp home" capability in the event of failure of the front drive mechanism. Another important result of the relatively high torque capability is the relatively low slip horsepower which is generated, and therefore, the relatively small amount of heat which must be dissipated in order for the device to be durable, and without significant reduction in fuel economy.

From the foregoing description, it should be apparent to those skilled in the art not only that the relationship between the amount of wheel spin of the front drive wheels 11 (or the slip speed within the particle clutch 29) is related to the amount of torque transmitted to the output shaft 19, but that such relationship depends upon a number of factors. These factors include the properties of the magnetically-reactive medium in the particle clutch 29 (which is variable according to the magnetic field applied according to the control algorithms), the clearances between the input coupling member 35 and the output coupling drum 43, the ramp angles of the first and second ramp surfaces 61 and 62, the clearances between the adjacent outer friction discs 65 and inner friction discs 67, and the biasing force of the springs 69. It is believed to be within the ability of those skilled in the art to select appropriate values for each of the factors noted above to achieve the desired relationship of torque on the output shaft 19 to slip of the front drive wheels 11.

Furthermore, it is also believed to be within the ability of those skilled in the art to design the friction discs 65 and 67, and to select any appropriate friction material to be applied thereto, in view of the manner of operation of the device 17. For example, if the clutch pack 33 is truly disengaged (transmitting no substantial torque) during normal driving conditions, it may be sufficient to use plain steel discs. On the other hand, if the device 17 is designed such that "disengaged" means that, for example, 30% of full torque will be transmitted to the output shaft 19 during normal driving conditions, then it will be more important to provide a suitable friction material capable of withstanding relatively high temperatures in continuous slipping conditions, such as the pyrolytic carbon friction material mentioned previously.

While the invention has been specifically described in connection with certain specific embodiments thereof, it is to be understood that this is by way of illustration and not of limitation, and the scope of the appended claims should be construed as broadly as the prior art will permit.

What is claimed is:

1. A differential device of the type including an input shaft adapted to receive input torque from a source of torque, an output shaft adapted to provide driving torque to an output device, a clutch pack including at least a first friction disc adapted to rotate with the input shaft and at least a second friction disc adapted to rotate with the output shaft, and a cam ramp actuator adapted to move the friction discs between a disengaged position and an engaged position, the actuator including first and second ramp plates and a plurality of cam members operably disposed between the first and second ramp plates, and in engagement with respective first and second ramp surfaces, the second ramp plate being disposed axially adjacent the friction discs and being operable to move the friction discs toward the engaged position, the differential device further comprising a particle clutch including an input coupling member for connecting to the input shaft, and an output coupling member connected to the first ramp plate, the input coupling member and the output coupling member defining a gap therebetween, the gap being filled with a magnetically-reactive medium, and the particle clutch further including a source of magnetic flux; and wherein the particle clutch is configured to operate with either a magnetically reactive powder or a magnetorheological fluid as the magnetically reactive medium.

2. The differential device recited in claim 1, wherein the magnetically-reactive medium comprises a magnetically reactive powder.

3. The differential device recited in claim 1, wherein the source of magnetic flux includes an electromagnet.

4. The differential device recited in claim 3, wherein the source of magnetic flux includes a permanent magnet.

5. The differential device recited in claim 1, wherein the gap is toroidal.

6. The differential device recited in claim 1, further comprising a housing defining, on its inside surface, at least one axially extending groove, the first friction disc and input coupling member each including at least one retention portion extending radially therefrom and being disposed within the axially extending groove, the housing further defining a shoulder surface extending radially outward adjacent the friction discs and including an endcap portion disposed axially adjacent the friction discs and in engagement with the shoulder surface, and the endcap portion and input coupling member each being axially fixed in relation to the housing.

7. The differential device recited in claim 6, wherein the housing comprises a unitary, stamped member having generally constant wall thickness.

8. The differential device recited in claim 6, wherein the housing defines a plurality of axially extending grooves.

9. The differential device recited in claim 8, wherein the first friction disc and the input coupling member each include a plurality of retention portions, each of the retention portions being disposed within one of the axially extending grooves.

10. The differential device recited in claim 9, wherein all of the axially extending grooves is occupied by at least one of the retention portions.

11. The differential device recited in claim 6, wherein the endcap portion comprises a separate endcap member, the housing defining a first rollover operable to retain the endcap member axially against the shoulder surface.

12. The differential device recited in claim 11, wherein the housing further includes a second rollover operable to retain the particle clutch axially against the cam ramp actuator.

13. The differential device recited in claim 6, wherein the housing further includes a rollover operable to retain the particle clutch axially against the cam ramp actuator.

14. The differential device recited in claim 1, wherein at least one of the input coupling member and the output coupling member includes a plurality of grooves for receiving the magnetically reactive medium when not under the influence of magnetic flux and for concentrating lines of magnetic flux across the gap.

15. The differential device recited in claim 1 further including at least one non-contacting type seal to substantially prevent the escape of magnetically reactive powder.

16. The differential device recited in claim 15, wherein the non-contacting type seal is a labyrinth seal.

17. A differential device of the type including an input shaft adapted to receive input torque from a source of torque, an output shaft adapted to provide driving torque to an output device, a clutch pack including at least a first friction disc adapted to rotate with the input shaft and at least a second friction disc adapted to rotate with the output shaft, and a cam ramp actuator adapted to move the friction discs between a disengaged position and an engaged position, the actuator including first and second ramp plates and a plurality of cam members operably disposed between the first and second ramp plates, and in engagement with respective first and second ramp surfaces, the second ramp plate being disposed axially adjacent the friction discs and being operable to move the friction discs toward the engaged position, the differential device further comprising a particle clutch including an input coupling member for connecting to the input shaft, and an output coupling member connected to the first ramp plate, the input coupling member and the output coupling member defining a gap therebetween, the gap being filled with a magnetically-reactive medium, and the particle clutch further including a source of magnetic flux; and wherein the source of magnetic flux includes a permanent magnet supplemented by a counteracting electromagnet.

* * * * *